(12) United States Patent
Choi

(10) Patent No.: US 7,443,863 B2
(45) Date of Patent: *Oct. 28, 2008

(54) CELL SWITCHING METHOD AND SYSTEM

(75) Inventor: Sang Jun Choi, Anyang-shi (KR)

(73) Assignee: LG Nortel Co., Ltd., Seoul (KR)

( * ) Notice: Subject to any disclaimer, the term of this patent is extended or adjusted under 35 U.S.C. 154(b) by 808 days.

This patent is subject to a terminal disclaimer.

(21) Appl. No.: 10/021,439

(22) Filed: Dec. 19, 2001

(65) Prior Publication Data

US 2003/0026266 A1 Feb. 6, 2003

(30) Foreign Application Priority Data

Dec. 19, 2000 (KR) .................. 10-2000-0078516

(51) Int. Cl.
*H04L 12/54* (2006.01)
(52) U.S. Cl. .................. 370/395.6; 370/395.7; 370/399
(58) Field of Classification Search ............. 370/395.6, 370/395.64, 409, 395.71, 412, 413, 428, 370/429, 395.7, 398, 399
See application file for complete search history.

(56) References Cited

U.S. PATENT DOCUMENTS

| | | | | |
|---|---|---|---|---|
| 6,574,223 | B1* | 6/2003 | Brueckheimer et al. | 370/395.6 |
| 6,594,267 | B1* | 7/2003 | Dempo | 370/395.64 |
| 6,597,696 | B1* | 7/2003 | Toyama et al. | 370/395.31 |
| 6,741,598 | B1* | 5/2004 | Murakami et al. | 370/395.6 |
| 6,747,974 | B1* | 6/2004 | Hayashi | 370/395.1 |
| 7,068,665 | B2* | 6/2006 | Lee | 370/395.6 |
| 7,263,098 | B2* | 8/2007 | Lee | 370/390 |
| 2003/0152108 | A1* | 8/2003 | Lee | 370/474 |

* cited by examiner

*Primary Examiner*—Aung S. Moe
*Assistant Examiner*—Feben M Haile
(74) *Attorney, Agent, or Firm*—Ked & Associates, LLP

(57) ABSTRACT

A cell switching method and system are disclosed that divide an input ATM cell into ATM adaptation layer (AAL) 2-type common part sublayer (CPS) packets. The divided CPS packets are stored in different first storage areas, in accordance with virtual paths/virtual channels (VPs/VCs) of the respective CPS packets, and identifiers of the first storage areas are also stored. The stored CPS packets are read in the order of the stored first identifiers. Thereafter, the read CPS packets are stored in second storage areas, in accordance with respective CIDs, and second identifiers of the second storage areas are stored. The CPS packets stored in the second storage areas are read in the order of the stored second identifiers and multiplexed to generate ATM cells.

17 Claims, 9 Drawing Sheets

FIG.5A

| VP/VC | input queue number |
|-------|--------------------|
| 1/2   | 1                  |
| 1/3   | 7                  |

FIG.5B

| VP/VC | CID | CID | output queue number |
|-------|-----|-----|---------------------|
| 1/2   | 3   | 7   | 3                   |
| 1/2   | 5   | 3   | 1                   |

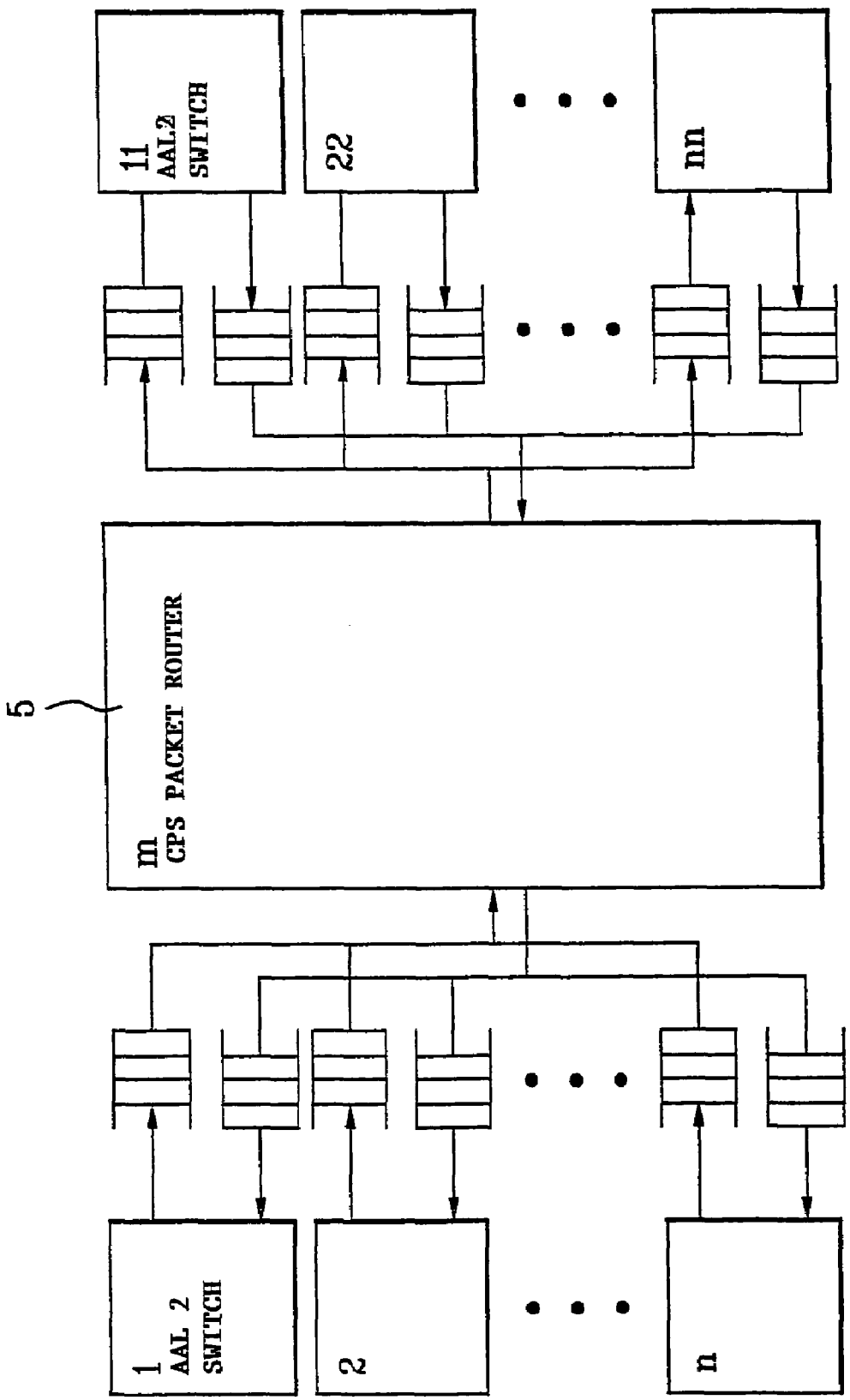

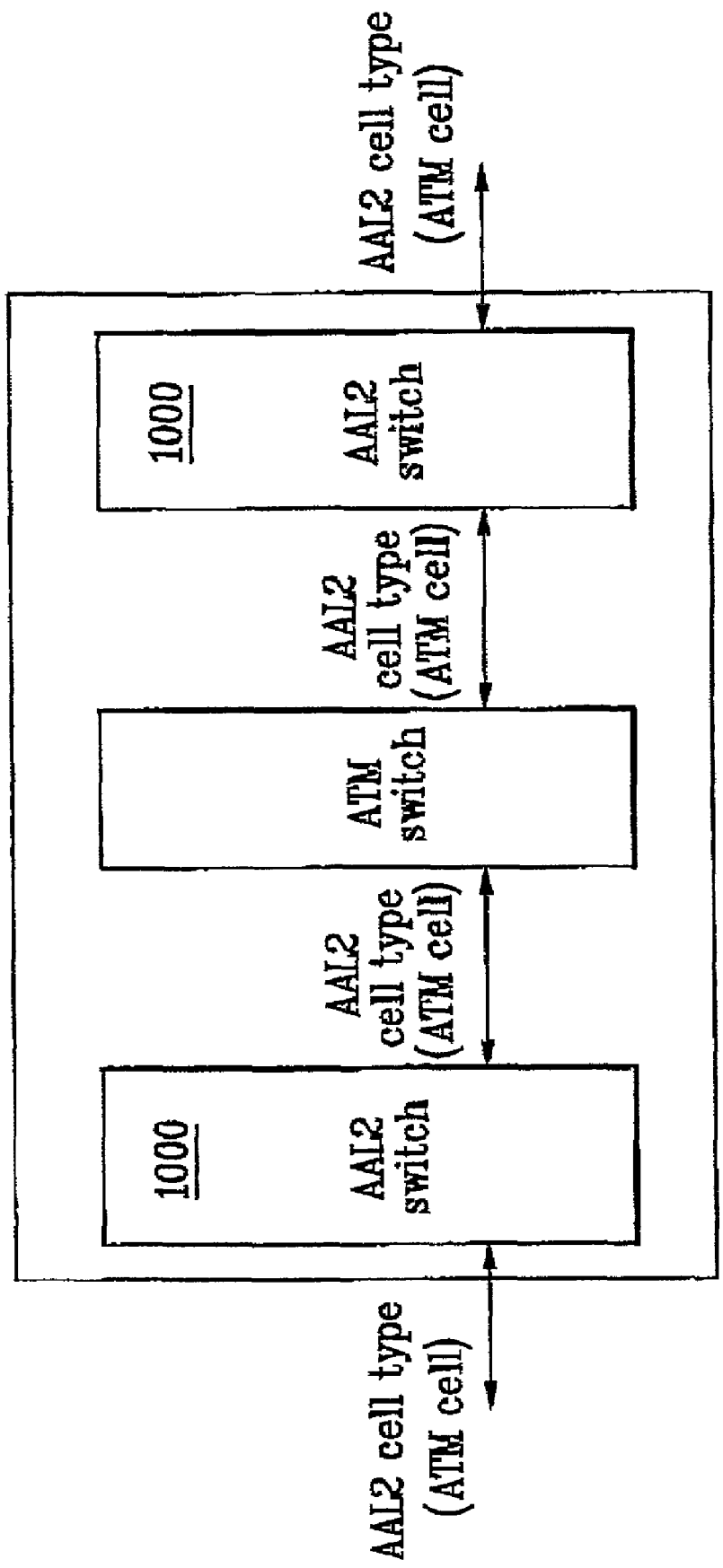

CELL SWITCHING METHOD AND SYSTEM

BACKGROUND OF THE INVENTION

This application claims the benefit of the Korean Application No. P2000-78516 filed on Dec. 19, 2000, which is hereby incorporated by reference.

1. Field of the Invention

The present invention relates to an asynchronous transfer mode (ATM) and, more particularly, to a cell switching method and a cell switching system.

2. Background of the Related Art

Generally, an ATM system divides user information into uniform packet sizes, generating cells of fixed sizes (53 bytes) by adding destination information to a header of each packet, and transfers the generated cells to a destination.

A protocol for transferring packet data in such an ATM system includes a physical layer, an ATM layer, an ATM adaptation layer (AAL), and an upper layer. The AAL layer divides and reassembles the packet data transferred from the upper layer and includes AAL1 to AAL5 types (see ITU-T I series recommendation).

The AAL2 protocol pack reduces the time taken to pack short segments of user data into an ATM cell by multiplexing or demultiplexing the short packets transferred from various users on an ATM network. This promotes the efficient use of the ATM network bandwidth. Namely, a basic concept of the AAL2 protocol is to multiplex or demultiplex various user data, which have short lengths as well as variable sizes, into a single ATM cell.

An AAL2 switch supporting the AAL2 protocol, according to the related art, will be described below.

FIG. 1 illustrates a block diagram of an AAL2 switch according to the related art. The AAL2 switch includes AAL2 transceiver units 10 that demultiplex an input AAL2 packet or multiplex the input AAL2 packet and an ATM switch 20 that switches an ATM cell at an ATM level.

The operation of the aforementioned AAL2 switch is as follows. First, an AAL2 receiving block in the AAL2 transceiver unit 10 demultiplexes the inputted cells, multiplexed as AAL2 common part sublayer (CPS) packets, into an AAL5 cell of 53 bytes. This is done to support packet switching at the ATM level.

Thereafter, the AAL2 receiving block transfers the converted AAL5 cell to the ATM switch 20. The ATM switch 20 transfers the AAL5 cell to an AAL2 transmitting block. Then, the AAL2 transmitting block de-converts and multiplexes the AAL5 cell into AAL2 CPS packets, so as to transmit the packets to a desired destination.

FIG. 2 illustrates a block diagram for explaining an AAL2 protocol recommended by ITU-T, according to the related art. An AAL2 protocol is divided into a service specific convergence sublayer (SSCS) and a common part sublayer (CPS).

Packet data of an upper application, in the form of service data units (SDUs), are transferred to an AAL through a service access point (SAP) of an upper layer (step S20). An AAL2 protocol SSCS then generates an SSCS-protocol data unit (PDU) by adding a header and tail to the SDU (step S21).

Successively, the CPS generates a CPS packet by adding a CPS header to the SSCS_PDU (or CPS-SDU), transferred from the upper layer, and generates a CPS-PDU of 48 bytes by adding a start field to the CPS packet (CPS-PDU payload) (steps S22, S23, and S24). In this case, the CPS-packet becomes a payload of the CPS-PDU. Since the CPS-PDU comprises 48 bytes, CPS packets of a plurality of users are multiplexed into the payload of the CPS-PDU (step S24).

Subsequently, the CPS-PDU is transferred to an ATM layer. Then, the ATM layer generates an ATM cell having a total size of 53 bytes, by adding a 5 byte header of destination information to the CPS-PDU (step S25). Thus, the packet data received from the upper layer are divided/assembled into 48 byte packets, through the AAL2 protocol, to be used for the payload of the ATM cell.

However, to communicate the AAL2 CPS packets across the ATM network, the ATM switch converts the AAL2 cell into the AAL5 cell, switches (i.e., communicates) the ATM cell to the corresponding destination, and then de-converts the ATM cell into the AAL2 CPS packets. Thereby, the ATM switch increases the complexity of the communication process as well as its processing time.

Moreover, the overhead of such an AAL2 switch degrades the quality of service (QoS) of a cell, thereby reducing the system efficiency.

SUMMARY OF THE INVENTION

An object of embodiments of the invention is to solve at least the above problems and/or disadvantages and to provide at least the advantages described hereinafter.

Accordingly, embodiments of the present invention is directed to a cell switching method and a cell switching system that substantially obviate one or more problems due to limitations and disadvantages of the related art.

Another object of embodiments of the present invention is to provide a cell switching method and a cell switching system in which the performance of the switch can be improved with regard to non-blocking, real-time routing, scalability, and testing.

A further object of embodiments of the present invention is to provide a cell switching method and system in which input, output, and time queues are provided to facilitate testing and scalability.

To achieve these objects and other advantages and in accordance with the purpose of embodiments of the invention, as embodied and broadly described herein, a cell switching method in a communication system of an asynchronous transfer mode (ATM) includes: a) dividing an input AAL2 cell into ATM adaptation layer (AAL) 2 type common part sublayer (CPS) packets; b) storing the divided CPS packets in different storage areas, in accordance with virtual paths/virtual channels (VPs/VCs) of the respective CPS packets, and storing identifiers of the storage areas; c) reading the stored CPS packets in the order of the stored identifiers of the storage areas, storing the read CPS packets in accordance with respective channel identifiers (CIDs), and storing the identifiers of the storage areas; and d) reading the CPS packets stored in step c) in the order of the identifiers of the storage areas stored in step c) and multiplexing the read CPS packets to generate an AAL2 cell.

In another aspect of embodiments of the present invention, a cell switching system in a communication system of an ATM includes: first, second, third, and fourth memories that sequentially store AAL2 type CPS packets and output them in their respective storage order, with each memory having a storage area. A reassembly processing unit divides an input AAL2 cell into the AAL2 type CPS packets, stores the divided CPS packets in different storage areas of the first memory, in accordance with VPs/VCs, and stores identifiers of the different storage areas in the second memory. A CPS packet switching unit reads the CPS packets stored in the first memory, in the order of the stored identifiers of the storage areas of the second memory, stores the read CPS packets in different storage areas of the third memory in accordance with respective CIDs, and stores the identifiers of the storage areas of the third memory in the fourth memory. An assembly processing unit reads the CPS packets stored in the third memory, in the order of the identifiers of the storage areas stored in the fourth memory, and multiplexes the read CPS packets to generate an AAL2 cell.

Additional advantages, objects, and features of embodiments of the invention will be set forth in part in the description which follows and in part will become apparent to those having ordinary skill in the art upon examination of the following or may be learned from practice of the invention. The objects and advantages of embodiments of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5A illustrates an input queue value of a virtual path/virtual channel according to embodiments of the present invention;

FIG. 5B illustrates an output queue value of a virtual path/virtual channel according to embodiments of the present invention;

FIG. 7 illustrates the connection of a multiplex CPS router according to the present invention; and FIG. 8 illustrates an example of a switching system according to embodiments of the present invention.

DETAILED DESCRIPTION OF PREFERRED EMBODIMENTS

Figure 1:
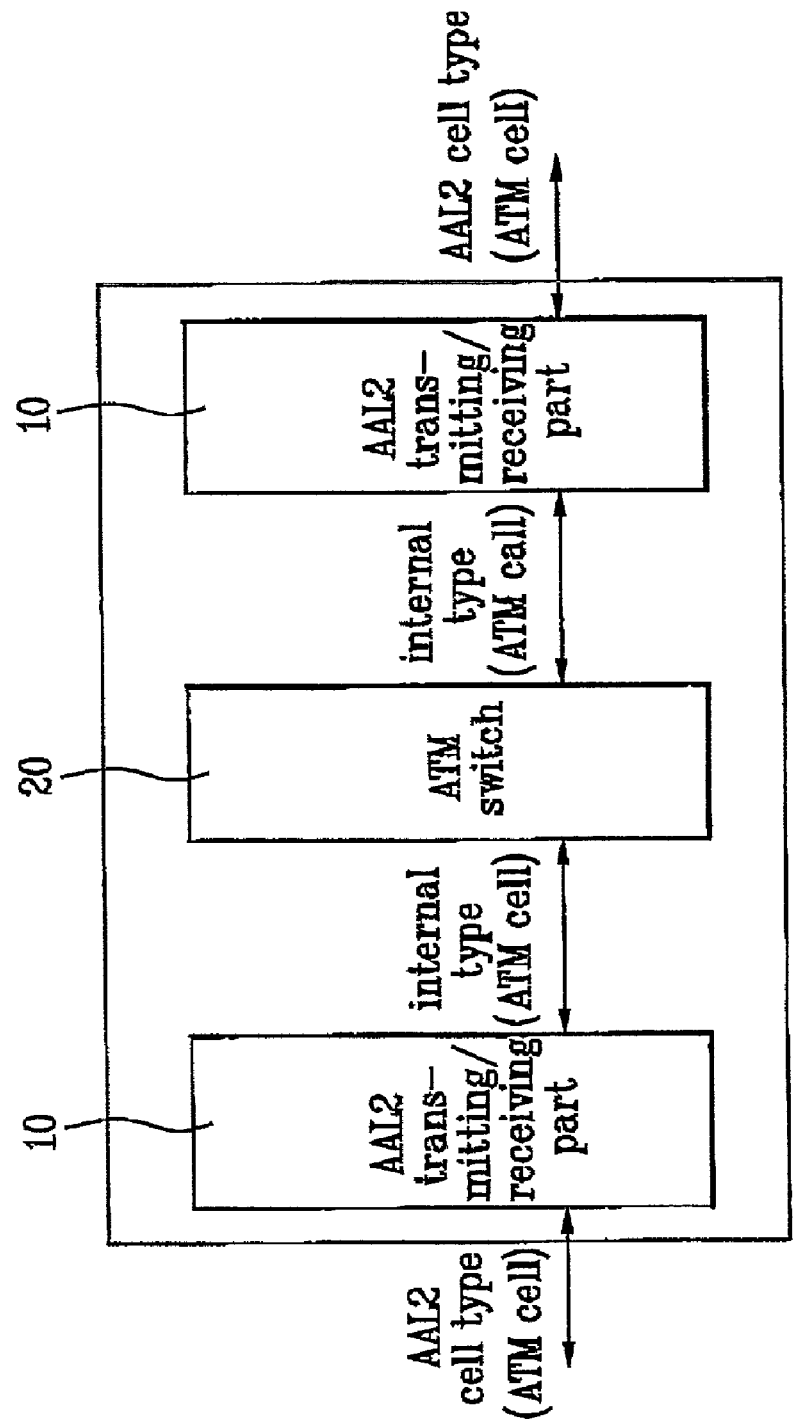
FIG. 1 illustrates a block diagram of an AAL2 switch according to the related art.
Figure 2:
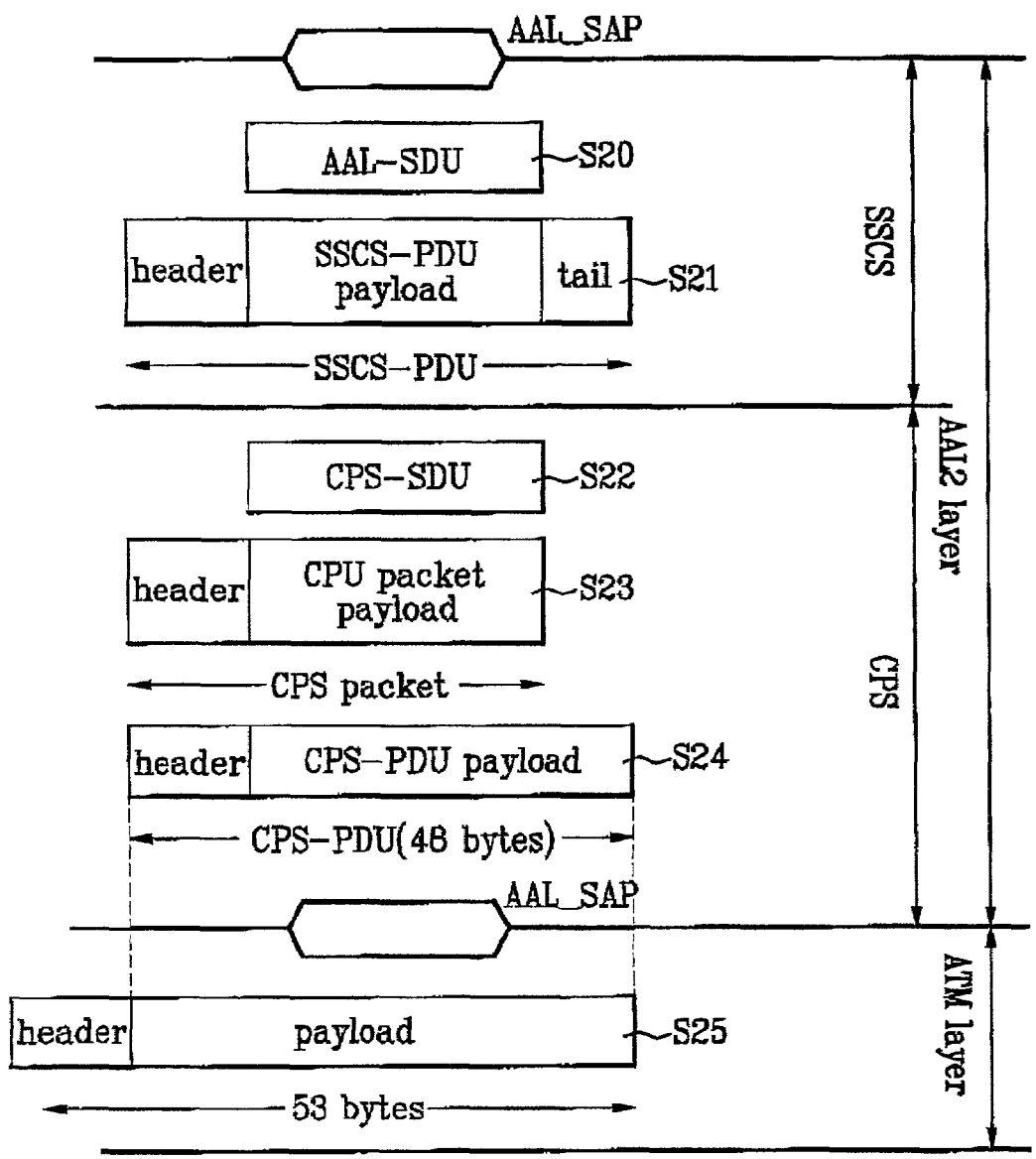
FIG. 2 illustrates a block diagram for explaining an AAL2 protocol recommended By ITU-T, according to the related art.
Figure 3:
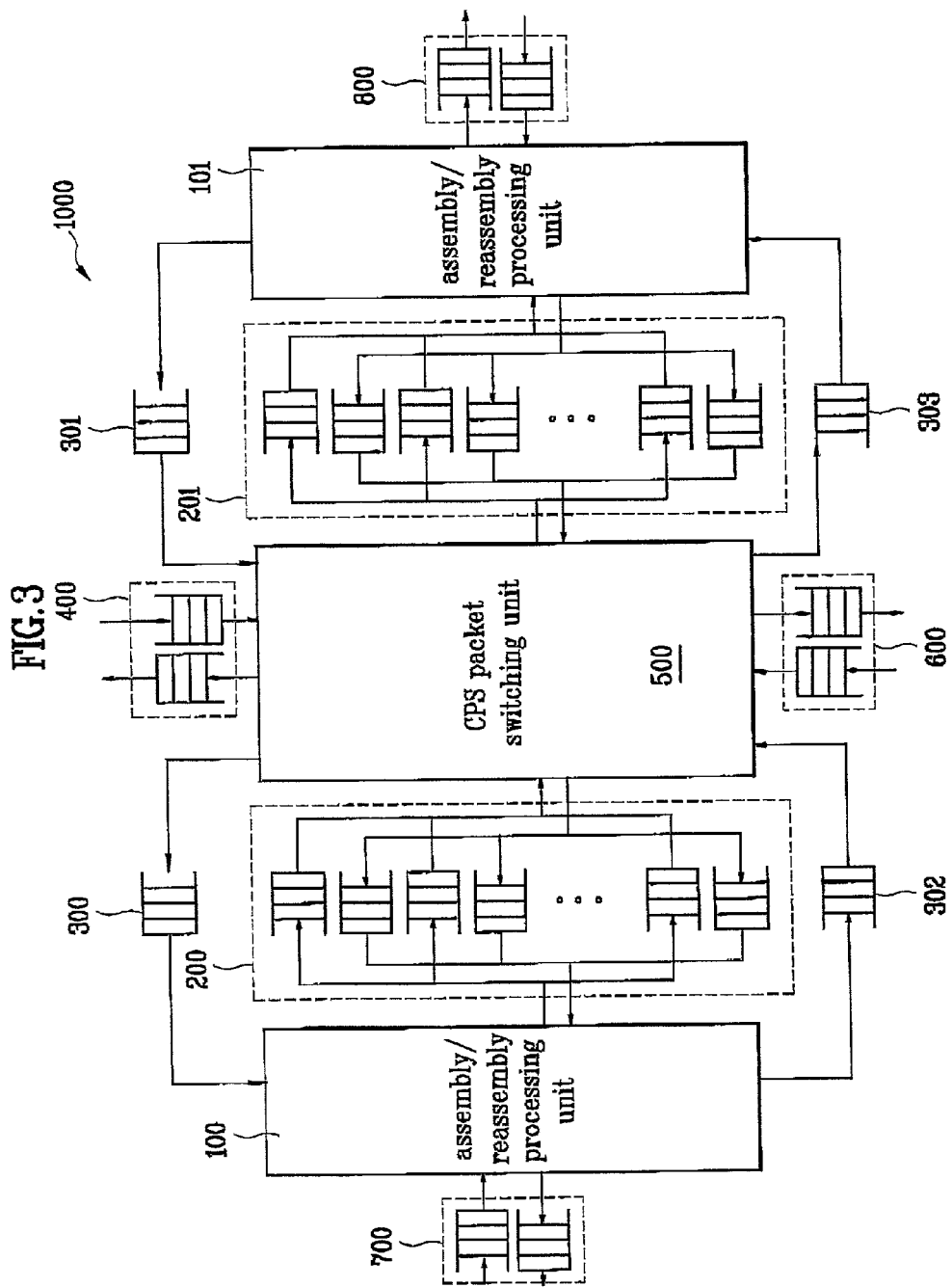
FIG. 3 illustrates a structure of a switching system according to embodiments of the present invention.

FIG. 3 illustrates a structure of a switching system 1000 according to embodiments of the present invention. The switching system, (i.e., an AAL2 switch) includes first input/output units 700 and 800 and second input/output units 200 and 201 that sequentially store input AAL2-type ATM cells and output the cells in the order of their arrival, from the first stored cell to the last stored cell (first in first out (FIFO) order). Third input/output units 301 and 302 and fourth input/output units 300 and 303 sequentially store input data and output the data in the order from the first stored cell to the last stored cell.

Assembly/reassembly processing units 100 and 101 divide the AAL2-type ATM cells from the first input/output units 700 and 800 into AAL2 CPS packets; write the CPS packets in a corresponding and numbered input queue of the second input/output units 200 and 201, with reference to a first reference table; and write the input queue number in the third input/output units 302 and 301. A CPS packet switching unit 500 reads the CPS packets from the second input/output units 200 and 201, in the order of the input queue number stored in the third input/output units 302 and 301; writes the read CPS packets in a corresponding output queue number of the second input/output unit 201 and 200, with reference to a second reference table; and writes the output queue number in the fourth input/output units 303 and 300.

The AAL2 switch includes a fifth input/output unit 400 that transmits and receives the input CPS packets, to provide a central processing unit (CPU) interface. The fifth input/output unit 400 outputs the input CPS packets in the first in first out order. The AAL2 switch implements testing or signaling in accordance with transmitting and receiving functions of the CPU interface and can be used as an AAL2-type end point at an ATM terminal.

The AAL2 switch of embodiments of the present invention further includes a sixth input/output unit 600 that routes the input CPS packets to another AAL2 switch, to provide a CPS packet router interface that enhances the scalability of the AAL2 switch. The sixth input/output unit 600 outputs the input CPS packets to a CPS packet router interface 5 of FIG. 7, in the first in first out order. The operation of the CPS packet router interface will be described later with reference to FIG. 6.

Therefore, the CPS packets that cannot be processed by one of a plurality of AAL2 switches 1~n to 11~nn are transferred to another AAL2 switch through the CPS packet router interface 5.

Input queue numbers corresponding to virtual paths/virtual channels (VPs/VCs) of the CPS packets are written in the first reference table, as shown in FIG. 5A. The CPS packets stored in one input queue are provided with one destination, that is one VP/VC. Also, channel identifiers (CIDs) and output queue numbers corresponding to CIDs and VPs/VCs of the CPS packets, read from the second input/output unit 200, are written in the second reference table, as shown in FIG. 5B.

Figure 6:
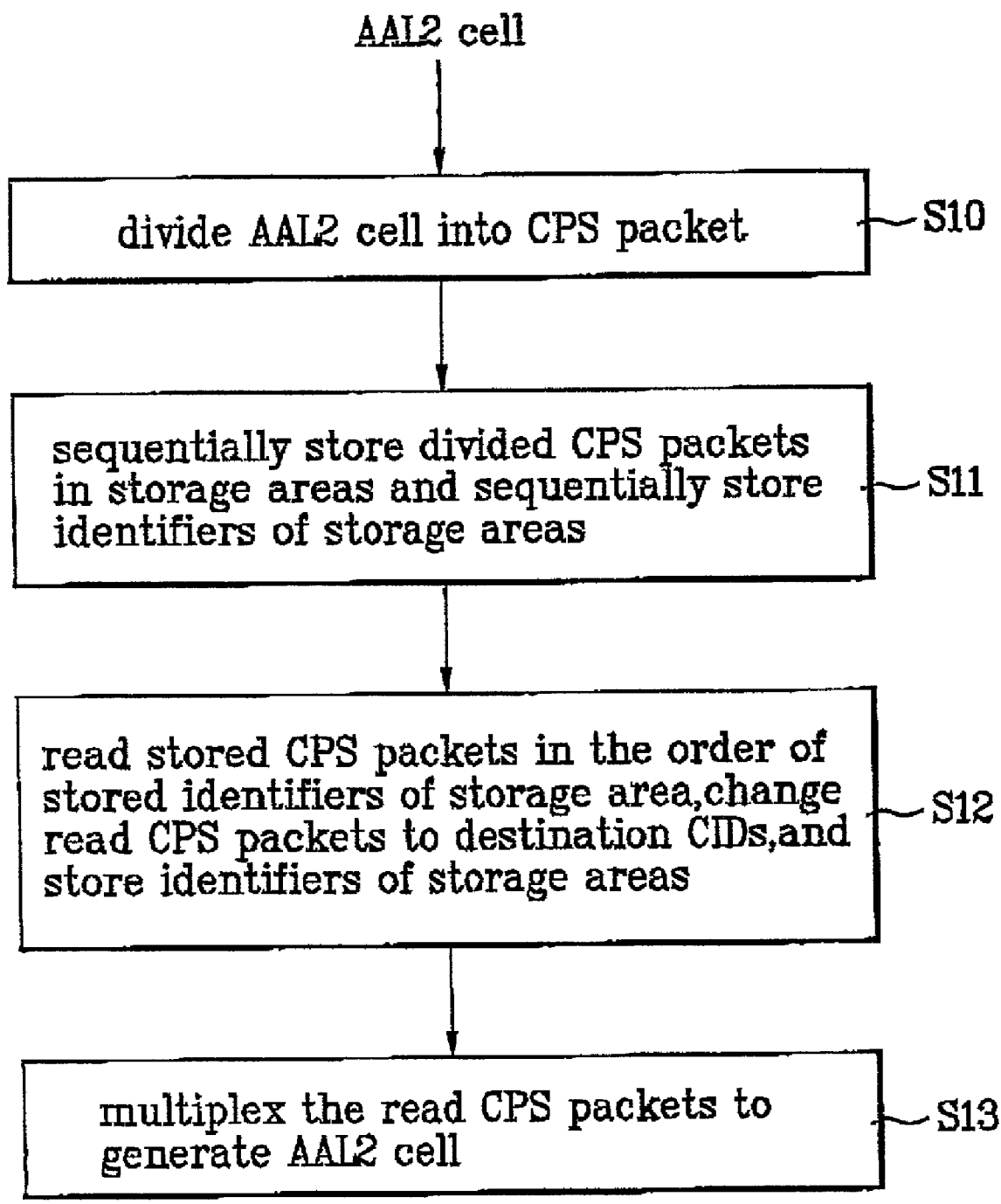
FIG. 6 is a flow chart illustrating a procedure of generating an AAL2-type ATM cell according to embodiments of the present invention.

The operation of the switching system 1000 will be described with reference to FIG. 6. The reassembly processing unit 100 divides the input AAL2 cell into AAL2-type CPS packets (S10), sequentially stores the divided CPS packets in storage areas of the second input/output unit 200, and sequentially stores identifiers of the storage areas of the second input/output unit 200 in the third input/output unit 302 (S11). The divided CPS packets are respectively stored in different storage areas of the second input/output unit 200 in accordance with different VPs/VCs, obtained from the first reference table. The first reference table maps the storage area identifiers with an arbitrary VP/VC.

The CPS packet switching unit 500 reads the CPS packets in the order of the storage area identifiers stored in the third input/output unit 302. Then, the CPS packet switching unit 500 sequentially stores the read CPS packets in storage areas of the second input/output unit 201 and sequentially stores identifiers of the storage areas of the second input/output unit 201 in the fourth input/output unit 303 (S12). The storage areas of the second input/output unit 201 are used to route the CPS packets to their destination.

To accomplish this, the CPS packet switching unit 500 reads the stored CPS packets. It then changes CIDs of the CPS packets to corresponding destination CIDs, while referring to the second table that shows the storage area identifiers mapped with an arbitrary CID. Thereafter, the CPS packet switching unit 500 sequentially stores the CPS packets in the storage area corresponding to the changed CID.

The assembly processing unit 101 reads the CPS packets in the order of the storage area identifiers stored in the fourth input/output unit 303, multiplexes the read CPS packets to generate an AAL2 cell, and writes the generated AAL2 cell in the first input/output unit 800 (S13).

Additionally, the CPS packet switching unit 500 sequentially stores the CPS packets in the fifth input/output unit 400 to implement signaling and testing of the switch and sequentially stores storage area identifiers of the fifth input/output unit 400 in the third input/output unit 302. The divided CPS packets are respectively stored in different storage areas of the fifth input/output unit 400, in accordance with the VP/VC mapping of the first reference table.

Furthermore, if cell switching is not implemented due to a system error of the cell switch, the CPS packet switching unit 500 sequentially stores the CPS packets in the sixth input/output unit 600 to route them to another cell switch and sequentially stores identifiers of the storage areas of the sixth input/output unit 600 in the third input/output unit 302. The divided CPS packets are respectively stored in different storage areas of the sixth input/output unit 600, in accordance with the VP/VC mapping of the first reference table VP/VC.

Figure 4A:
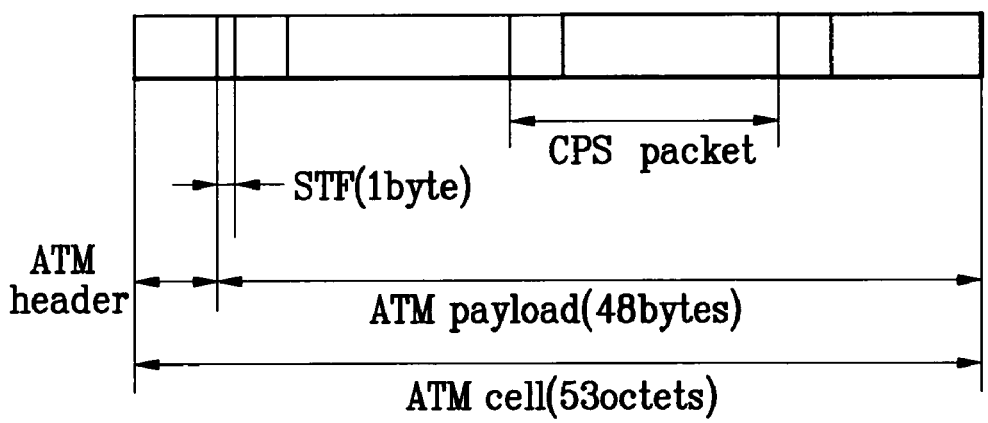
FIG. 4A illustrates a structure of an AAL2-type ATM cell according to embodiments of the present invention.
Figure 4B:
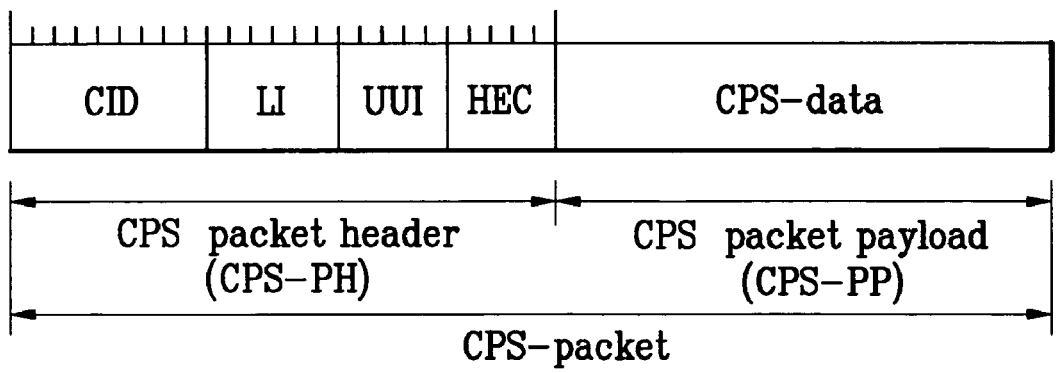
FIG. 4B illustrates a structure of an AAL2-type CPS packet according to embodiments of the present invention.

Once the AAL2-type ATM cells of FIG. 4A, having different VPs/VCs, are input to the reassembly processing unit of the AAL2 assembly/reassembly processing unit 100, the AAL2 reassembly processing unit divides the AAL2-type ATM cells into the AAL2-type CPS packets of FIG. 4B. Also, the divided CPS packets are written in the input queue of the second input/output unit 200. Referring now to FIG. 5A, the VC/VP of the GPS packets identifies the corresponding input queue of the second input/output unit 200 into which the divided CPS packets are written.

Figure 4C:
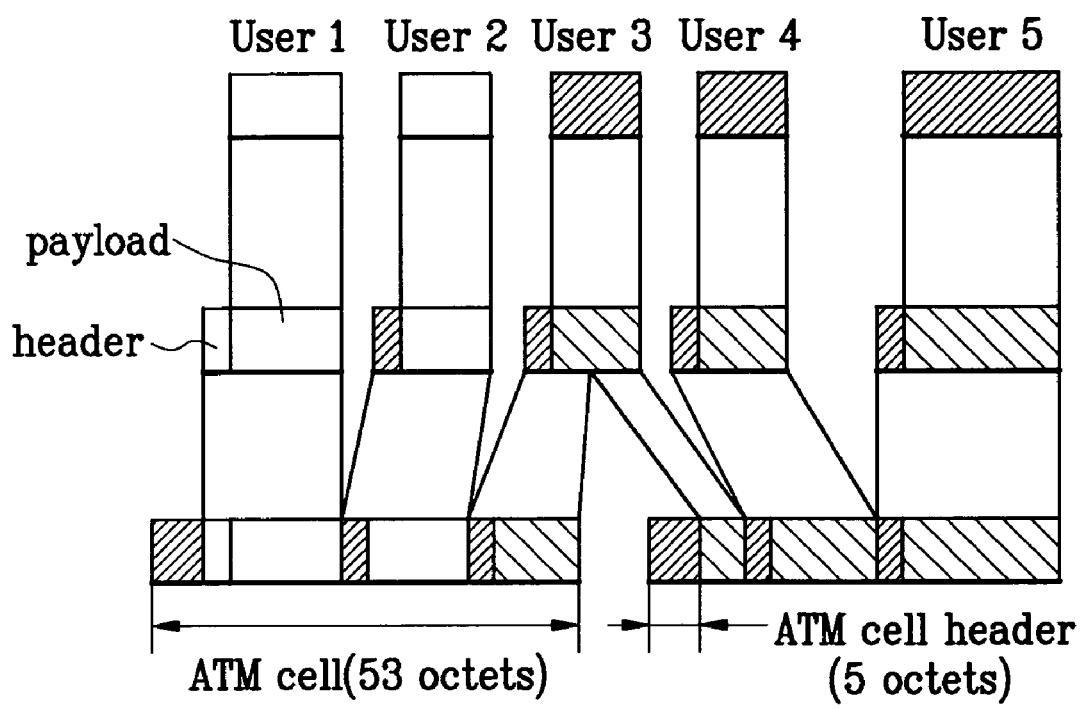
FIG. 4C illustrates a procedure of generating an AAL2-type ATM cell according to embodiments of the present invention.

FIG. 4A illustrates the AAL2-type ATM cells, and FIG. 4B illustrates the CPS packets of the AAL2-type ATM cells. FIG. 4C illustrates how the payload data of multiple users is formed into CPS packets, shown by FIG. 4B, and then multiplexed by the assembly/reassembly unit 100, 101 to form multiple ATM cells, as shown by FIG. 4A. The AAL2-type ATM cells are multiplexed into a Start field (STF) and a plurality of CPS packets.

Each of the CPS packets includes CID data, length indicator (LI) data, user to user indication (UUI) data, header error control (HEC) data, and CPS data. The LI data are stored in a payload. That is to say, the CPS packet of the AAL2-type ATM cells includes a packet header consisting of the CID data, the LI data, and the HEC data and a packet payload consisting of the data.

For example, suppose an AAL2-type ATM cell having a VP/VC of ½ and another AAL2-type ATM cell having a VP/VC of ⅓ are input to the reassembly processing unit of the assembly/reassembly processing unit 100. In this case, once the AAL2-type ATM cell having a VP/VC of ½ is input, the reassembly processing unit of the assembly/reassembly processing unit 100 divides the ATM cell into AAL2 CPS packets, as shown in FIG. 4B. The reassembly processing unit also writes the AAL2-type CPS packets, having the VP/VC of ½, into input queue number 1, of the second input/output unit 200, and writes the input queue number 1 in the third input/output unit 302.

Subsequently, the AAL2-type ATM cell having a VP/VC of ⅓ is input and the reassembly processing unit of the assembly/reassembly processing unit 100 divides the input ATM cell into AAL2 CPS packets, as shown in FIG. 4B. The reassembly processing unit also writes the AAL2-type CPS packets, having the VP/VC of ⅓, into input queue number 7, of the second input/output unit 200, and writes the input queue number 7 in the third input/output unit 302.

Once any one of the input queue numbers is stored in the third input/output unit 302, the CPS packet switching unit 500 reads the stored input queue number to identify the input queue number of the second input/output unit 200 holding the stored AAL2-type CPS packets. Thereafter, the CPS packet switching unit 500 reads the CPS packets stored in the identified queue. Thereby, the switching function is implemented.

That is to say, the CPS packet switching unit 500 determines the processing order of the CPS packets stored in the corresponding input queue in accordance with the order of the input queue number stored in the third input/output unit 302. Therefore, the CPS packet switching unit 500 can switch the CPS packets in the order of the first divided CPS packet using the third input/output unit 302.

The CPS packet switching unit 500 reads the CPS packets from the second input/output unit 200 in accordance with the above order and then writes the read CPS packets in the corresponding output queue of the second input/output unit 201, while referring to the second reference table of FIG. 5B.

For example, in the second reference table of FIG. 5B, the CPS packet having a VP/VC of ½ and a CID of 3 is changed to have a CID of 7. The CPS packet having the changed CID is written in the output queue number 3 of the second input/output unit 201. Also, the output queue number 3 is written in the fourth input/output unit 303. Likewise, referring to the reference table of FIG. 5B, the corresponding CID of the CPS packet having the VP/VC of ½ and the CID of 5 is changed to 3, and the CPS packet having the changed CID is written in the output queue number 1 of the second input/output unit 201. The output queue number 1 is written in the fourth input/output unit 303, also.

Once any one of the output queue numbers is stored in the fourth input/output unit 303, the assembly processing unit 101 obtains the identified queue number and reads the CPS packet written in the identified output queue to generate an AAL2 cell. The assembly processing unit 101 writes the generated AAL2 cell in the first input/output unit 800.

Meanwhile, the CPS packet switching unit 500 can return the CPS packets input for test to their original position. That is, if the CPS packet having a CID of 3 is input to the AAL2-type ATM cell having a VP/VC of ¾, the CPS packet switching unit 500 can return the CPS packet together to the AAL2-type ATM cell having the VP/VC of ¾. Thereafter, the resequenced CPS packets may be compared to a standard.

FIG. 7 illustrates connection of a multiplex CPS router according to embodiments of the present invention. A CPS packet router 5 provides scalability to the AAL2 switch. A CPS packet that cannot be processed by one of the AAL2 switches 1.about.n, 11.about.nn is transferred to another AAL2 switch through the CPS packet router 5.

FIG. 8 illustrates an example of a switching system 1000 according to embodiments of the present invention. Unlike the related art, AAL2 cell switching according to the present invention is implemented in such a manner that an AAL2 cell is directly switched without changing into an AAL5 cell.

The cell switching method and the cell switching system 1000 according to embodiments of the present invention have the following advantages.

It is possible to decrease traffic in the ATM switch of the system by use of an AAL2 switch having input, output and time queues. Also, since the CPU interface is installed with a loop back path within the AAL2 switch, it is possible to facilitate test capabilities and provide scalability through the CPS packet router, thereby facilitating the capacity expansion of the AAL2 switch. As a result, performance of the whole system can be improved.

The above references are incorporated by reference herein where appropriate for appropriate teachings of additional or alternative details, features and/or technical background.

The foregoing embodiments and advantages are merely exemplary and are not to be construed as limiting embodiments of the present invention. The present teaching can be readily applied to other types of apparatuses. The description of embodiments of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An asynchronous transfer mode (ATM) cell switching method, comprising:
   a) dividing an input ATM adaptation layer 2 (AAL2) cell into AAL2 type common part sublayer (CPS) packets;
   b) sequentially storing the divided CPS packets into a plurality of first storage areas each having a queue type structure and with each first storage area corresponding to a different one of a plurality of virtual paths/virtual channels (VPs/VCs) of the respective CPS packets, and sequentially storing first identifiers of the plurality of first storage areas in a sequential order, each first identifier corresponding to a different one of the plurality of first storage areas and to a different one of the plurality of VPs/VCs, wherein the sequentially storing the first identifiers includes generating a first reference table that maps each of the first identifiers in the sequential order to the corresponding one of the VPs/VCs;
   c) reading the stored CPS packets in the order of the first identifiers stored in the first reference table, sequentially storing the read CPS packets in a plurality of second storage areas used to route the GPS packets to each destination, wherein each of the plurality of second storage areas has a queue type structure and that corresponds to a different one of a plurality of destination channel identifiers (CIDs), and sequentially storing second identifiers of the plurality of second storage areas, each second identifier corresponding to a different one of the plurality of second storage areas and to a different one of the plurality of destination CIDs, wherein the sequential storing the second identifiers includes generating a second reference table that maps each of the second identifiers in the sequential order to the corresponding one of the plurality of destination CIDs; and
   d) reading the CPS packets, in the sequential order of the second identifiers, from the second storage areas and multiplexing the read CPS packets to generate a reconstructed AAL2 cell,
   wherein c) comprises changing origination CIDs of the read CPS packets to the corresponding destination CIDs, and sequentially storing the read CPS packets in the plurality of second storage areas corresponding to the destination CIDs.

2. The ATM cell switching method of claim 1, wherein the CPS packets are stored in the plurality of first storage areas according to their respective order of arrival, and the CPS packets are stored in the second storage areas according to their respective order of arrival.

3. The ATM cell switching method of claim 1, wherein the CPS packets are read from the plurality of first storage areas according to their respective order of storage, and the CPS packets are read from the second storage areas according to their respective order of storage.

4. The ATM cell switching method of claim 1, wherein the first and second identifiers are stored in the sequential order that the CPS packets are stored to the corresponding first and second storage areas, respectively.

5. The ATM cell switching method of claim 1, wherein the CPS packets are read from the plurality of first storage areas according to their respective sequential order of storage, and the CPS packets are read from the plurality of second storage areas according to their respective sequential order of storage.

6. The ATM cell switching method of claim 1, further comprising implementing a switching test by reading the CPS packets from the plurality of second storage areas in the sequential order of the second identifiers and comparing the read CPS packets to a standard.

7. The ATM cell switching method of claim 1, further comprising implementing a switch signaling by reading the CPS packets from the plurality of second storage areas in the sequential order of the second identifiers and outputting the read CPS packets to a processor.

8. The ATM cell switching method of claim 1, further comprising routing the CPS packets stored in the plurality of first storage areas to another switch in the sequential order of the first identifiers.

9. An asynchronous transfer mode (ATM) cell switching system, comprising:
   a reassembly processing unit that divides an input ATM adaptation layer 2 (AAL2) cell into AAL2-type common part sublayer (CPS) packets;
   a first memory that sequentially stores the divided CPS packets into a plurality of first storage areas with each of the plurality of first storage areas having a queue type structure and corresponding to a different one of a plurality of virtual paths/virtual channels (VPs/VCs) and that sequentially stores first identifiers of the first storage areas in a sequential order, each first identifier corresponding to a different one of the plurality of first storage areas and to a different one of the plurality of VPs/VCs, wherein the first memory includes a first reference table that maps the first identifiers to the corresponding one of the plurality of VPs/VCs;
   a CPS packet switching unit that reads the stored CPS packets from the plurality of first storage areas in the sequential order of the stored first identifiers and routes the read CPS packets;
   a second memory that sequentially stores the routed CPS packets into a plurality of second storage areas with each of the plurality of second storage areas having a queue type structure and corresponding to a different one of a plurality of destination channel identifiers (CIDs), and sequentially stores second identifiers of the plurality of second storage areas in a sequential order, each second identifier corresponding to a different one of the plurality of second storage areas and to a different one of the plurality of destination CIDs, wherein the second memory includes a second reference table that maps the second identifiers to the corresponding one of the plurality of destination CIDs; and
   an assembly processing unit that reads the CPS packets from the plurality of second storage areas in the sequential order of the second identifiers based on the second reference table and multiplexes the CPS packets read from the plurality of second storage areas to generate a reconstructed AAL2 cell,
   wherein the CPS packet switching unit changes origination channel identifiers (CIDs) of the CPS packets read from the plurality of first storage areas based on the first reference table to the corresponding destination CIDs and sequentially stores the read CPS packets in the plurality of second storage areas corresponding to the destination CIDs based on the second reference table.

10. An asynchronous transfer mode (ATM) cell switching system, comprising:
first, second, third, and fourth memories that each sequentially store ATM adaptation layer 2 (AAL2) type common part sublayer (CPS) packets and output the CPS packets in a sequential order of their respective storage, wherein each of the first, second, third and fourth memories has a separate plurality of storage areas;
a reassembly processing unit that divides an input AAL2 cell into the AAL2 type CPS packets, stores the divided CPS packets in different ones of a plurality first storage areas of the first memory with each of the plurality of first storage areas having a queue type structure and corresponding to a different one of a plurality of virtual paths/virtual channels (VPs/VCs), and stores first identifiers of the different ones of the plurality of first storage areas in the second memory, each one of the plurality of first storage areas having a different first identifier that corresponds to one of the plurality of VPs/VCs;
a CPS packet switching unit that reads the CPS packets stored in the first memory in a sequential order of the first identifiers stored in the second memory, stores the read CPS packets in different ones of a plurality of second storage areas of the third memory with each of the plurality of second storage areas having a queue type structure and corresponding to a different one of a plurality of destination channel identifiers (CIDs), and stores second identifiers of the plurality of second storage areas in the fourth memory, each of the plurality of second storage areas having a different second identifier that corresponds to one of the plurality of destination CIDs; and
an assembly processing unit that reads the CPS packets stored in the third memory in a sequential order of the second identifiers stored in the fourth memory and multiplexes the read CPS packets to generate a reconstructed AAL2 cell.

11. The ATM cell switching system of claim 10, further comprising:
a first reference table that maps the first identifiers with the corresponding VPs/VCs; and
a second reference table that maps the second identifiers with the corresponding destination CIDs.

12. The ATM cell switching system of claim 11, wherein the reassembly processing unit refers to the first reference table to determine the first storage areas corresponding to the VPs/VCs of the CPS packets.

13. The ATM cell switching system of claim 11, wherein the CPS packet switching unit refers to the second reference table to determine the respective destination CIDs corresponding to the CPS packets.

14. The ATM cell switching system of claim 13, wherein the CPS packet switching unit changes origination CIDs of the CPS packets read from the first memory to the corresponding destination CIDs, with reference to the second reference table.

15. The ATM cell switching system of claim 10, wherein the first and second identifiers are stored in the sequential order that the CPS packets are stored to the corresponding first and second storage areas, respectively.

16. The ATM cell switching system of claim 10, further comprising:
a central processing unit that reads the CPS packets from the first memory in the sequential order of the stored first identifiers and implements testing and signaling for switching.

17. The ATM cell switching system of claim 10, further comprising:
a plurality of cell switches that each has first, second, third, and fourth memories, a reassembly processing unit, a CPS packet switching unit, and an assembly processing unit; and
a router that routes the CPS packets output from one of the plurality of cell switches to another cell switch.

* * * * *